United States Patent [19]

Smyk

[11] Patent Number: 6,161,128

[45] Date of Patent: *Dec. 12, 2000

[54] INTERNET BASED SERVICE CONTROL SYSTEM ALLOWS TELECOMMUNICATIONS SUBSCRIBER MODIFIES TELECOMMUNICATIONS SERVICES THROUGH AN INTERNET GATEWAY

[75] Inventor: Darek A. Smyk, Piscataway, N.J.

[73] Assignee: Telcordia Technologies, Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,635

[22] Filed: Aug. 14, 1996

[51] Int. Cl.[7] .......................... G06F 15/16; G06F 15/177
[52] U.S. Cl. ........................ 709/205; 709/201; 709/203; 709/221
[58] Field of Search ............................. 370/271; 379/207, 379/201, 89; 709/205, 201, 203, 221

[56] References Cited

U.S. PATENT DOCUMENTS

| | | | |
|---|---|---|---|
| 5,574,779 | 11/1996 | Ely et al. | 379/207 |
| 5,629,978 | 5/1997 | Blumhardt et al. | 370/271 |
| 5,703,940 | 12/1997 | Sattar et al. | 379/201 |
| 5,712,903 | 1/1998 | Bartholomew et al. | 379/89 |

OTHER PUBLICATIONS

Heylighen, "World–Wide Web a distributed hypermedia paradigm for global networking", Apr. 18, 1994, pp. 355–368, SHARE Europe Spring Conference.

*Primary Examiner*—Le Hien Luu
*Attorney, Agent, or Firm*—Joseph Giordano

[57] ABSTRACT

An Internet based service control channel connects a subscriber to a service provider. The subscriber can get information about the services, can get subscriber-specific information and can directly make changes to service via the Internet channel.

2 Claims, 8 Drawing Sheets

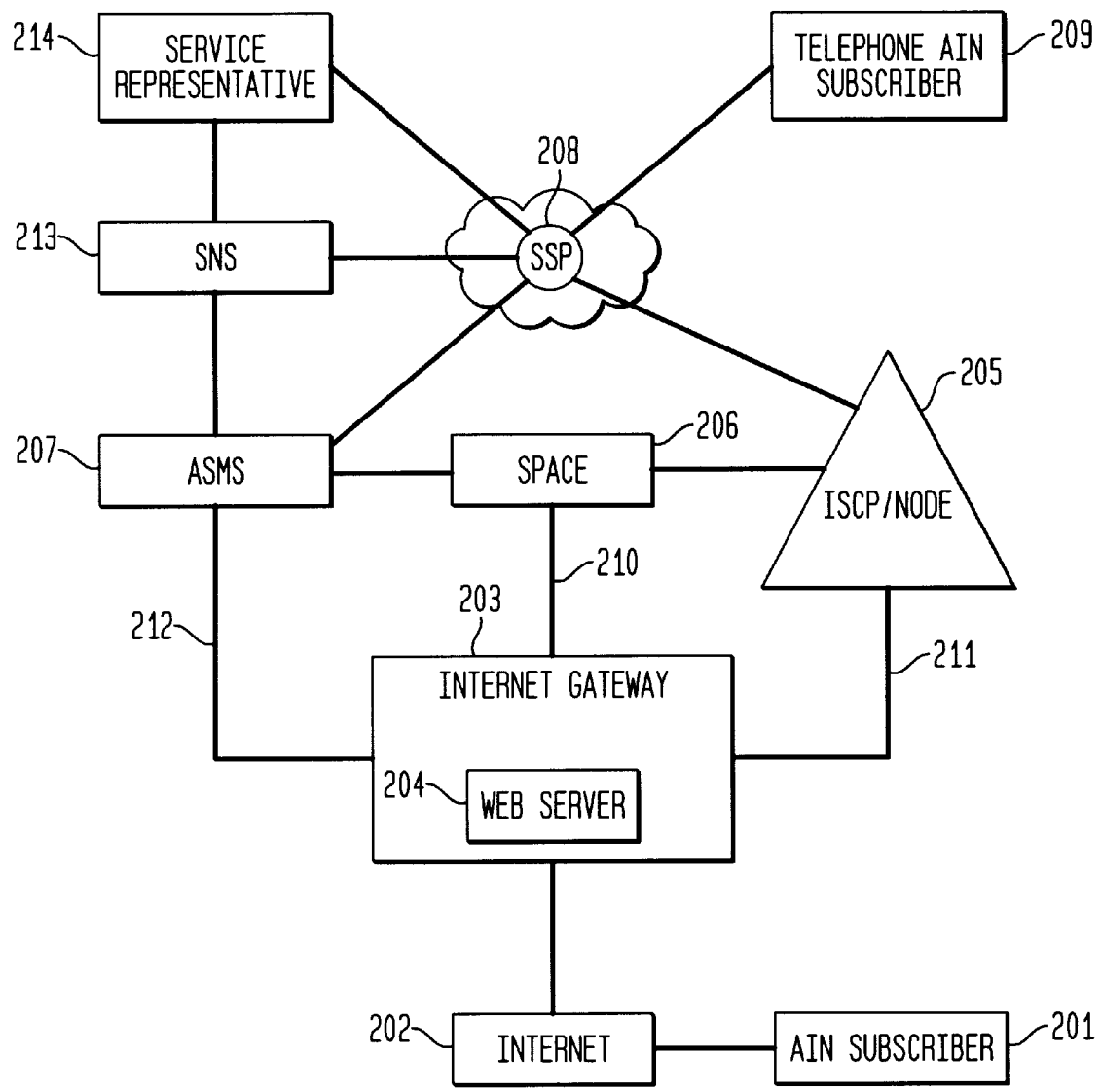

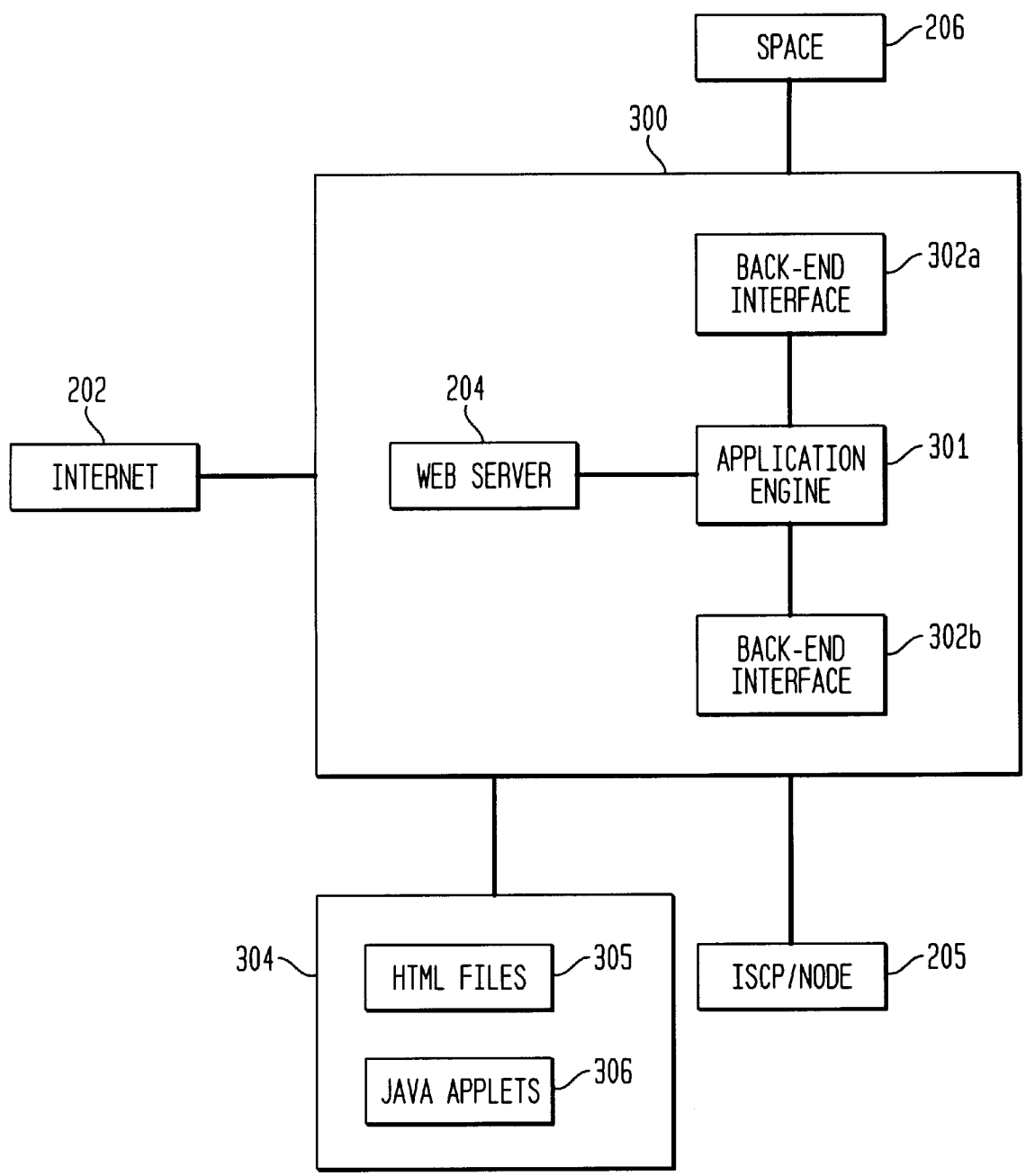

FIG. 4A

In order to change your service you need to enter your telephone number and password. When you finished entering the information please click the SUBMIT button.

Telephone Number: [201 567 5000] ⎯ 401

For security reasons, please enter one of the following passwords:

- The last 4 digits of your FlexFone Calling Card: [****] ⎯ 402
- The last 3 digits of your FlexFone account number: [     ] ⎯ 403
- Your 4 digits Pay by Phone PIN: [     ] ⎯ 404

[SUBMIT] ⎯ 405

FIG. 4B

Service Features for Account 2015675000

Please use this page to request modifications to your FlexFone service. Just make all the desired modifications and click the SUBMIT button.

Unconditional Call Forwarding — 406

Enable unconditional call forwarding: ☒ — 407

Forward all calls to: [9088804718] — 408

Call Forwarding on Busy//No Answer — 409

Enable call forwarding on Busy/No Answer: ☐ — 410

When Busy/No Answer forward calls to: [9088804718] — 411

Incoming Call Screening — 412

Enable incoming call screening: ☐ — 413

Accept only calls originating from the following numbers:

[2012343000] — 414
[2013454000]
[         ]

Forward all other calls to:
[2016787000] — 415

When you are finished with making changes to the table please click on the Submit button.   416 — [SUBMIT]

Checking the cancel button will abort any changes to service.   [CANCEL] — 417

INTERNET BASED SERVICE CONTROL SYSTEM ALLOWS TELECOMMUNICATIONS SUBSCRIBER MODIFIES TELECOMMUNICATIONS SERVICES THROUGH AN INTERNET GATEWAY

CROSS REFERENCE TO RELATED APPLICATION

This application is related to U.S. patent application Ser. No. 08/594,749, entitled "System and Method for Integrating ISCP and Internet Services," filed Jan. 31, 1996 by Darek A. Smyk; and to U.S. patent application Ser. No. 08/690,253 entitled "Customer Contact Services Node/Internet Gateway," filed Jul. 24, pending, 1996 by Darek A. Smyk et al., the contents of which are incorporated by reference.

BACKGROUND OF THE INVENTION

The present invention relates generally to telecommunication networks and more particularly to the Internet and Internet services.

Currently, telecommunication companies provide advanced intelligent network (AIN) services. AIN service subscribers are demanding a variety of more flexible and faster ways of making changes to their AIN services. AIN service subscribers also seek to have more control over their services. The currently deployed AIN service control infrastructure is meeting these demands to varying degrees. The flexible service creation environment of Bellcore's proprietary SPACE® application allows network operators to quickly and economically implement and deploy new services. In general, once an AIN service is deployed on the network, AIN service subscribers can make modifications through two service control channels: a live service representative or an interactive voice response (IVR) system.

In the live service representative service channel, the AIN subscriber calls the company's customer support center and describes the service modifications over the telephone to the service representative. The service representative then manually enters the service modifications into the service negotiation system (SNS), which propagates the requested changes in the network.

Alternatively, the AIN subscriber can call a self-service IVR center and specify the requested service changes via interactions with an intelligent peripheral (IP). The IP uses IVR technology to play voice prompts, announcements, and menus, as well as to collect the AIN subscriber's input. Most often, the AIN subscriber will enter service modification information via the DTMF keypad of the telephone. If the IP is equipped with a speech recognition module, the AIN subscriber can also enter service changes orally. Such voice recognition modules are rarely used in practice, however, because they are not effective.

FIG. 1 is a block diagram of a conventional telephone access AIN service control system. As shown in FIG. 1, the AIN subscriber 101 uses a telephone to access either an IP 103 or a service representative 107 through SSP 102 to make changes to service. Both the IP 103 and the service representative 107 are contacted by the AIN subscriber 101 over voice lines through the SSP 102, over a public switched telephone network (PSTN) 110. When service changes are made through the IP 103, they are transmitted to the integrated services control point (ISCP)/node 104.

When service changes are made through the service representative 107, the AIN subscriber 101 details the changes to the service representative 107 who manually enters them through the service negotiation system (SNS) 108. The SNS 108 forwards the requested changes over a dataline to service activation controller (SAC) 106. The advanced services management system (ASMS) 109 is Bellcore's implementation of a service activation controller network component. Depending on the scope of the service changes requested by the AIN subscriber 101, the SAC 106 issues the change requests to SPACE application 105 and/or to AIN switch trigger/event data stored in the SSP 102. A workstation 111 is connected to SPACE application 105 through which service changes can be directly implemented.

The service control channels described above and shown in FIG. 1 have several limitations and disadvantages. The live service representative channel is very costly to the service provider because the expense of maintaining an adequate number of trained service representatives can be great. Additionally, users of certain AIN services, such as call routing, may need to make changes to their service many times a day. The cost of employing a sufficient number of service representative to handle the volume of calls for such a service can also be great. Additionally, voice based interactions limit the amount of data that the AIN service subscribers can specify while requesting service modifications. This consideration becomes important with AIN services that involve a large amount of customizable data, such as the Centrex Extent service for business customers.

The telephone based self-service channel has limitations as well. While such a channel does not have the costs associated with a live service representative channel, it is subject to even greater limitations on the amount of data that can be transmitted between the service subscriber and the network. In practice, telephone users find it difficult to navigate through more than three levels of voice menus and enter more than several DTMF data strings per session. In addition, certain types of data are very difficult to specify via a DTMF keypad, such as modifying a routing schedule for a service involving time of day or day of week routing. Thus, while a telephone self-service channel is more economical than a live service representative channel, it can only be used efficiently to control certain types of services involving limited amounts of data.

Due to the limitations of the existing service control channels, there is a need for a ubiquitous, user-friendly, cost effective, and flexible AIN service control channel and method. The present invention utilizes the Internet to provide such a control channel to AIN subscribers.

The recent explosion in the use of the Internet host provided many new business opportunities and presents significant opportunities to providers of traditional network services. The number of Internet users is growing exponentially, stimulating network service providers to create new services to capture this new market. It is estimated that by 1999, 14 million households will subscribe to Internet access services. This number, however, reflects only a portion of the total number of Internet users because many people have access to the Internet through their school or place of employment. In fact, the current number of Internet users is estimated to be 30 million. The debut of the Microsoft Network service with full Internet access and the addition of Internet access to online services such as Prodigy, CompuServe, and America Online are expected to bring even more potential customers online. It is projected that use of the Internet will continue to rise and therefore it is desired to provide customer services to Internet users.

One successful and widely publicized portion of the Internet is the World Wide Web (WWW or the Web). Once connected to the WWW, a user utilizes a browser to display "home pages"—graphical representations of information stored on WWW servers connected to the Internet.

Many companies have home pages that allow Internet users to get information regarding the companies. However, most corporate home pages are still in their infancy and most provide only generic, non-customer specific information. Additionally, most corporate home pages do not permit customers to make queries or to make changes to their service. Adding this capability would create a more personalized and dynamic exchange with an existing or potential customer. Interactions could be custom tailored and product advertisements could be made user-specific based on customer profiles or other data stored in corporate databases.

It is therefore desirable to provide Internet based control of AIN services that substantially obviates one or more of the problems due to limitations and disadvantages of the related art.

It is also desirable to enable users to change or update their AIN services by directly accessing, through the Internet, the switches through which such changes are made.

It is also desirable to enable Web interface users to change and/or update their AIN services and data.

Additionally, it is desirable to provide a Web interface capable of supporting the exchange of large amounts of data between AIN subscribers and a network.

Moreover, it is desirable to allow AIN subscribers to see all changes on their computer screen, and provide a mechanism for changes to AIN services to be made very quickly and efficiently.

Finally, it is desirable to provide architecture for supporting Internet based support of AIN services.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims and drawings.

DESCRIPTION OF THE INVENTION

The Internet based service control channel and method of accessing and changing AIN services via the Internet of the present invention make it possible for users to directly access information about their services and make changes to those services. The user can directly make transient or persistent changes to their services via the Internet. This is done by providing a gateway between a provider's WWW home page and AIN services and databases.

AIN subscribers gain access to the Internet and to the service control channel of the present invention using traditional Internet access methods. For example, users obtain Internet access via an Internet link from any of the commercial Internet services providers and interact with the service control channel Web site using any known Web browser software, such as Netscape's Navigator or Microsoft's Internet Explorer. Therefore, users of the Internet based services control channel of the present invention need not obtain any additional hardware or software to use or gain the benefits from the present invention.

Thus, the present invention advantageously provides the opportunity to update self-service options via the WWW more quickly and efficiently than through either a live service representative channel or an IP.

An additional benefit of the present invention is that it can be used with existing applications, such as Bellcore's proprietary SPACE application, the ISCP/node, and ASMS. Additionally, the gateway of the present invention may be deployed without making any changes to existing systems. For example, the SPACE system does not need to be changed to support the Internet based service control channel system and method of the present invention.

The Internet based service control channel and method of the present invention is also easy to use because AIN subscribers who make service changes over the Internet will, by and large, be familiar with the WWW technology used to implement the user interfaces. Additionally, the graphical nature of the service control channel will provide for an efficient exchange of large amounts of data between AIN subscribers and service providers. For example, subscribers accessing the Centrex Extent service will be able to view all the service parameters in a table form and will be able to make changes to those parameters. Being able to see the service parameters will make modifications much easier to make and will decrease erroneous service modifications. Subscribers will also be able to avoid the lengthy voice menu announcements of a telephone self-service channel. Service providers will also be able to increase their revenues using the Internet based service control channel of the present invention. Service providers will be able to increase their penetration of the AIN market and will have the opportunity to offer new services to Internet AIN subscribers that such users had not subscribed to before.

The Internet based service control channel of the present invention is beneficial to service providers as well. First, the control channel of the present invention is very cost effective and will allow service providers to offer more and different services which heretofore were difficult or quite expensive to modify. Additionally, an Internet based service control channel will use network resources very efficiently.

To achieve these and other advantages and in accordance with the purposes of the invention, as embodied and broadly described, the invention includes an Internet based AIN service control channel for processing a service modification request entered by an Internet user to an AIN service provider, wherein the service modification request is displayed to the user, the Internet based AIN service control channel comprising an Internet gateway for accepting the service modification request, and at least one interface coupled to the Internet gateway for providing access to at least one customer service and for permitting direct changes to the at least one customer service in response to the service modification request.

In accordance with the purposes of the invention, as embodied and broadly described, the invention also includes a method for user modification to services and data of an AIN provider in which the user accesses the Internet and displays a set of available AIN services of the AIN provider, the method for user modification comprising entering, by the user, a service modification request to one of the available AIN services, displaying the request to the user, accepting the request via an Internet based service control channel, permitting a modification directly to one of the available AIN services based on the request; and providing information about the request through the Internet and the Internet based service control channel to the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the Drawings:

FIG. 2 is a block diagram of an Internet based service control channel in accordance with a preferred embodiment of the present invention;

FIG. 3 is a block diagram of an Internet gateway used with the Internet based service control channel shown in FIG. 2;

FIGS. 4A–4C are exemplary screens illustrating how a user could interface with an Internet based service control channel in accordance with one embodiment of the present invention;

BEST MODE FOR CARRYING OUT THE INVENTION

Figure 1:
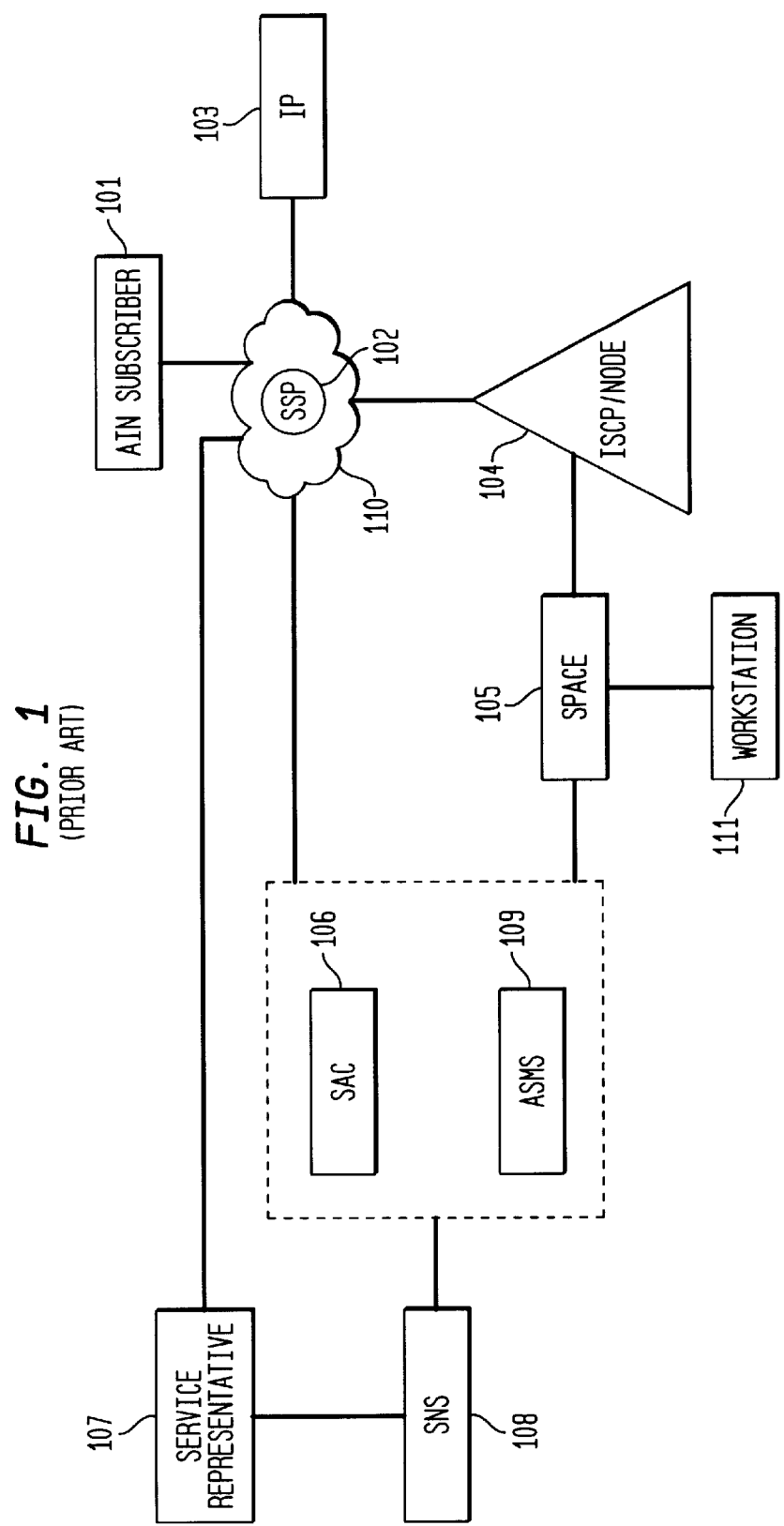
FIG. 1 is a block diagram of a conventional telephone access AIN service control system.

Reference will now be made in detail to the construction and operation of preferred implementations of the present invention which are illustrated in the accompanying drawings. In those drawings, like elements and operations are designated with the same reference numbers where appropriate.

The following description of the preferred implementations of the present invention is only exemplary of the invention. The present invention is not limited to the implementations, but may be realized by other implementations.

FIG. 2 is a block diagram of an Internet based services control channel in accordance with a preferred embodiment of the present invention.

As shown in FIG. 2, an AIN subscriber 201 interfaces with a service provider, such as the SPACE apparatus 206 via the Internet 202 and one Internet gateway 203. Specifically, an AIN subscriber 201 accesses the Internet 202 and is connected thereto via the HTTP/TCP/IP protocol. The AIN subscriber 201 can be connected to the Internet 202 via a PC, a UNIX workstation, a wireless personal assistant, or any other type of device used to access the Internet 202. The Internet 202 communicates with the Internet gateway 203 also via the HTTP/TCP/IP protocol. The Internet gateway 203 provides a gateway interface between the AIN subscriber 201 and the service provider's applications systems 205–207, described in greater detail below. The Internet gateway 203 runs standard WWW server software that accepts HTTP requests from AIN subscriber 201.

The Internet gateway 203 includes a Web server 204. The Web server 204 preferably comprises a conventional Internet server, such as Webstar from Quarterdeck Corp. or Netscape Communications Server from Netscape Communications Corp. The Web server 204 also communicates with the Internet 202 via the HTTP/TCP/IP protocol. To communicate on the Web, the AIN subscriber 201 preferably runs a Web browser application that supports hyperlinks based retrieval of documents stored in Web files any place on the Internet and/or retrieval and execution of Java Applets. Preferably, the Web server 204 is designed for commercial use with high availability and performance and built-in security support.

The Internet gateway 203 is coupled to an integrated services control point/node (ISCP/node) 205. The ISCP/node 205 system is Bellcore's implementation of the service control point component of AIN networks. Multiple AIN network switches communicate with the ISCP/node 205 for service related instructions via SS7 or ITU-T CCS7 network interfaces and manage calls based on these instructions. In addition, the ISCP/node 205 provides call processing instructions to other components of the AIN such as switches (not shown).

The connection between the Internet gateway 203 and the ISCP/node 205 is preferably made via ISCP interface 211. The ISCP interface can be an interface such as that described in Bellcore document Special Report (SR) 3511. The connection to the ISCP/node 205 via the ISCP interface 211 is preferably made when the AIN subscriber 201 seeks to make service modifications that are transient in nature. In other words, the ISCP interface 211 is used with service changes that are frequently made. This is due to the nature of the data stored in the databases associated with the ISCP/node 205. Service modifications preferably made using the ISCP interface 211 include, for example, call forwarding. These service modifications become effective in the shortest amount of time because the ISCP/node 205 is updated directly. In contrast, when an update is made to the SPACE application 206, the changes must be propagated from the SPACE application 206 to the ISCP/node 205 and therefore the changes take longer to implement then do changes directly made to the ISCP/node 205.

The Internet gateway 203 is also preferably connected to the SPACE application 206. The SPACE application 206 generates call processing records (CPR) and stores them in a database, not shown, associated therewith. The SPACE application 206 can be used for entering and storing service subscriber specific subscription data and is the service creation and provisioning tool of the ISCP/node 205. The SPACE application 206 provides complete control of end-to-end service development, testing, and provisioning. The SPACE application 206 has an easy to use graphical user interface (GUI) with point and click icons for service creation.

The SPACE application 206 is connected to the Internet gateway 203 by the SPACE interface 210. The SPACE interface can be an interface such as that described in Bellcore document SR-3506. The SPACE interface 210 is especially appropriate for supporting AIN service modifications that are persistent in nature and that have a modification scope limited to AIN service subscription data stored in one or more databases, not shown, associated with the SPACE application 206. For example, the SPACE interface 210 may be accessed when the AIN subscriber 201 wants to make changes to a Switch Redirect service. The Switch Redirect service is a disaster recovery service to reroute calls in the event of a central office, subscriber office, or business office failure. The SPACE application 206 is also connected to the ISCP/node 205. As described above, service requests through the SPACE application 206 and the SPACE interface 210 will be propagated to the ISCP/node 205 to instantiate the service requests. Thus, these service requests take longer to implement.

The Internet gateway 203 is also preferably connected to the advanced service management system (ASMS) 207 or to any other service activation control system. ASMS is Bellcore's implementation of a general service activation controller of a network system. Service activation controllers such as ASMS 207 generally provide connectivity between service providers, service negotiation systems, and AIN network elements such as SCPS, SSPS, and IPS. This connectivity is provided through the network or element managers of these elements. In general, service activation controllers, such as ASMS 207, store and manage the customer order, subscription, and service databases.

The connection between the Internet gateway 203 and the ASMS 207 is via an ASMS interface 212. The ASMS interface 212 preferably supports AIN service modifications that go beyond the scope of merely updating the databases associated with the ISCP/node 205. For example, the ASMS interface 212 preferably supports service update requests that involve turning on/off triggers in AIN switches. For example, through ASMS interface 212, call screening service requests can be made that update the ISCP/node 205 database and also update trigger data in an AIN switch.

The services control channel of the present invention uses one gateway, Internet gateway 203, and one or more of the different interfaces 210-212 depending on the scope of changes requested by the AIN subscriber 201. For example, if an AIN subscriber 201 wishes to subscribe to call incoming screening service, update data in the SSP 208 is sent to the service activation controller within the ASMS 207. On the other hand, if the AIN subscriber 201 wants to make a change to his call forwarding service, update data is not sent to the SSP 208 but is sent directly to the ISCP/node 205. The software of the system makes a decision as to which interface 210–212 is used based on the scope of the requested service change.

As shown in the above described embodiment of the present invention, three interfaces, the ISCP interface 211, the SPACE interface 210, and the ASMS interface 212 are used to implement service changes made by an AIN subscriber 201 via the Internet 202. It should be noted that all three of these interfaces 210–212 are not required for operation of the present invention. Indeed, there may be instances in which it is desired to provide only one or two of the interfaces 210–212. This choice depends on the provider's services and what type of changes and updates the service providers want to allow subscribers to make on their own through an Internet gateway. Additionally, market needs, implementation resource availability, and impacts on existing systems should also be considered when a provider determines what types of interfaces to provide between its services and its subscribers through the Internet.

As also shown in FIG. 2, the service channel of the present invention can also support service modifications via a telephone interface. This may be done in one of two ways, a direct connection with a live service representative 214 or self-service with an IP (not shown). A telephone AIN subscriber 209 can advise the service representative 214 of any desired service modifications, which the service representative 214 will make through the SNS 213. This type of service modification is described in greater detail with respect to FIG. 1 and highlights that the service control channel of the present invention compliments conventional service modification methodologies. Thus, the present invention, in a preferred embodiment, utilizes existing resources to provide an enhanced service modification regime. The telephone AIN subscriber 209 can also make service requests or modifications via an IP (not shown) as described with respect to FIG. 1.

FIG. 3 is a block diagram of an Internet gateway 300 used with the service control channel of the present invention. The Internet gateway 300 includes Web server 204, application engine 301, and back-end interfaces 302. Web server 204 is connected to the application engine 301. The application engine 301 implements the application functions of the Internet gateway 300. In general, the application engine 301 responds to the queries of subscribers forwarded by the Web server 204 by returning Java Applets, HTML files, and/or HTML templates augmented with data from the SPACE application 206, the ISCP/node 205, and the ASMS 207. The application engine 301 interacts with the Web server 204 using the interface of the Web server 204 to external applications. This interface can preferably be a common gateway interface (CGI), the Netscape server application program interface (NSAPI), when a Netscape Web server is used, or the information server application program interface (ISAPI), when a Microsoft server is used.

The application engine 301 is preferably connected to the back-end interfaces 302a and b. The back-end interfaces 302a and b interface with back-end systems. As shown in FIG. 3, the back-end systems preferably include the SPACE application 206 and the ISCP/node 205. The back-end systems, however, can be any appropriate provider applications that the provider wishes to allow a user to access and update and can include ASMS 207 and any other appropriate service activation controller. The back-end interfaces 302a and b also preferably support an application program interface (API) that describes how various interfaces could be accessed by the application engine 301, making development of the application engine 301 easier. The API can be used by the application engine 301 to exchange data between the back-end systems 205 and 206.

The gateway 300 is also preferably connected to a file storage 304. Within the file storage 304 are hypertext mark up language (HTML) files 305 that are served to Internet users by the gateway 300. The HTML files 305 preferably include text, graphics, video, and sound files. Some of the HTML files 305 include place holders for data that will be retrieved by the back-end systems 205 and 206. The HTML files 305 may also preferably include client scripts, for example, JavaScript, that will execute on the client side. A script is a set of software programs that execute a client's computer. A script can do, for example, data entry validation in which a telephone number entered via a keyboard and appearing on a screen can be validated before being sent back to the gateway 300.

The file storage 304 may also preferably include Java Applets 306 which are served to users by the gateway 300 and executed on the client side. For instance, the Java Applets 306 can preferably include screen-based data collection forms with service simulation and validation functions that will be performed on the Web client platform.

The architecture of the Internet based services control channel of the present invention allows for distributed processing of the service change requests issued by AIN service users. Traditionally, WWW users input is processed either by the application engine connected to a web server (via CGI, NSAPI or ISAPI) and/or by the application executing on the user's browser PC/workstation (via Javascript, Java applet, browser plug-in). The present invention also allows for ISCP based implementation of processing of the web users requests. For example, service change requests forwarded to the ISCP/node via interface 211 could trigger execution of Call Processing Records (CPRs) stored in the ISCP database. The CPRs are created using SPACE graphical programming language for the describing processing performed in the ISCP/node. Traditionally ISCP/node executes CPRs to respond to requests for information sent by telephone switches. The present invention also allows for the use of CPRs to implement processing of web user requests for AIN service change. Based on this capability the processing of AIN user's service change request could be distributed between user's PC/workstation 201 running Internet browser and/or the Internet gateway application engine 301 and/or ISCP/node 205.

Figure 4C:
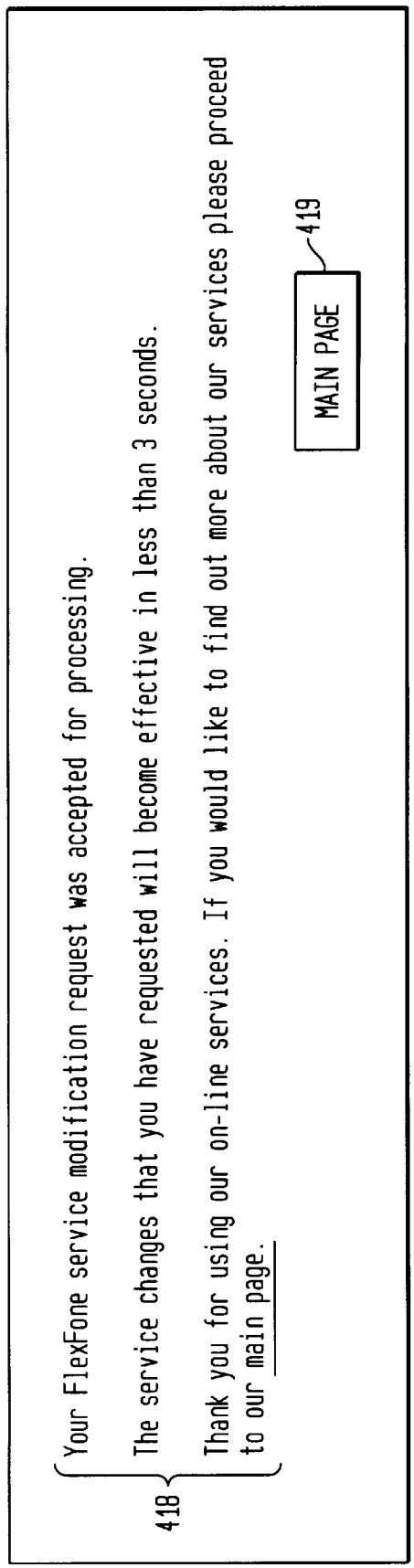

The Internet based services control channel of the present invention preferably uses multimedia to present information to AIN subscribers. Thus, information presentation will preferably include form-based screens of data, graphics, video, and sound. AIN subscribers will be able to enter data relevant to their service changes utilizing a keyboard and/or mouse. An exemplary set of screens showing how an AIN subscriber can update services is shown in FIGS. 4A–4C. It should be noted that the format of such screens can vary greatly and that FIGS. 4A–4C are exemplary only.

FIG. 4A shows an example of a provider's home page according to the present invention. An AIN subscriber 201, shown in FIG. 2, could access this screen, or one like it, through the Internet 202 and the Internet gateway 203 of the present invention. As shown in FIG. 4A, the AIN subscriber 201 may be required to enter identification information before any requested changes to service can be made. First, in the case of a telecommunications provider, the user may be prompted to enter his telephone number in box 401. After entering the telephone number, the user may be required to enter a password which can be, for example, a certain number of digits of a calling card number 402, an account number 403, or a PIN number 404. After the telephone number and password have been entered, the user preferably selects the submit key 405 and proceeds on to the service modification screen shown in FIG. 4B. The service modification screen shows the services that the AIN subscriber 201 can subscribe to and allows the AIN subscriber 201 to directly enter changes to service. The screen shown in FIG. 4B is exemplary only as the services available to different AIN subscribers 201 will differ.

In the service modification screen shown in FIG. 4B, the AIN subscriber 201 can change the unconditional call forwarding service in box 406. To enable unconditional call forwarding, the AIN subscriber 201 marks box 407. Once unconditional call forwarding is enabled, the AIN subscriber 201 enters the telephone number to which calls to the telephone number entered in box 401 in FIG. 4A are to be forwarded in box 408. In accordance with the present invention, the AIN subscriber 201 directly makes this change to his service and there is no need for intervention by the service provider. The service change is preferably made using either the ISCP interface 211 or the SPACE interface 210 and once selected and confirmed, the necessary changes are directly made to the associated databases and/or switches.

As also shown in FIG. 4B, the AIN subscriber 201 can make changes to the Call Forwarding on Busy/No Answer service in box 409. To enable this service, the AIN subscriber 201 marks box 410. Once enabled, the AIN subscriber 201 enters in box 411 the telephone number to which calls to the telephone number entered in box 401 in FIG. 4A are to be forwarded.

As also shown in FIG. 4B, the user can change his Incoming Call Screening service in box 412. The AIN subscriber 201 enables this service in box 413. The AIN subscriber then enters the telephone numbers that are to be accepted in boxes 414 and enters the telephone number to forward all other calls to in box 415.

Once all changes to services have been entered the AIN subscriber 201 clicks on the submit box 416. If the AIN subscriber 201 wants to cancel the changes to service that have been entered, the cancel box 417 is clicked on. After the service changes have been entered, the screen such as that shown in FIG. 4C may appear.

The confirmation screen of FIG. 4C will, for example, inform the AIN subscriber 201 that the service modifications have been accepted for processing and when the service changes will be made in message text 418. Additionally, the confirmation screen may advise the AIN subscriber 201 that he will receive a separate confirmation by mail. The confirmation screen could also be configured to inform the AIN subscriber 201 that a separate confirmation of the service modifications will be sent by e-mail. Also at the confirmation screen, the AIN subscriber 201 can return to the provider's main page by selecting the main page box 419.

As described above, FIGS. 4A–4C are exemplary screens that can be displayed when an AIN subscriber 201 accesses a provider's services through the gateway of the present invention. The screens provided to the AIN subscriber will differ depending on the services made available by the provider. Additionally, the screens a specific provider makes available can differ depending on the services subscribed to by an AIN subscriber 201. Furthermore, the screens may differ depending on the geographical location of the subscriber and the different services at different locations and on whether the AIN subscriber 201 is a business or an individual, among other things.

Figure 5:
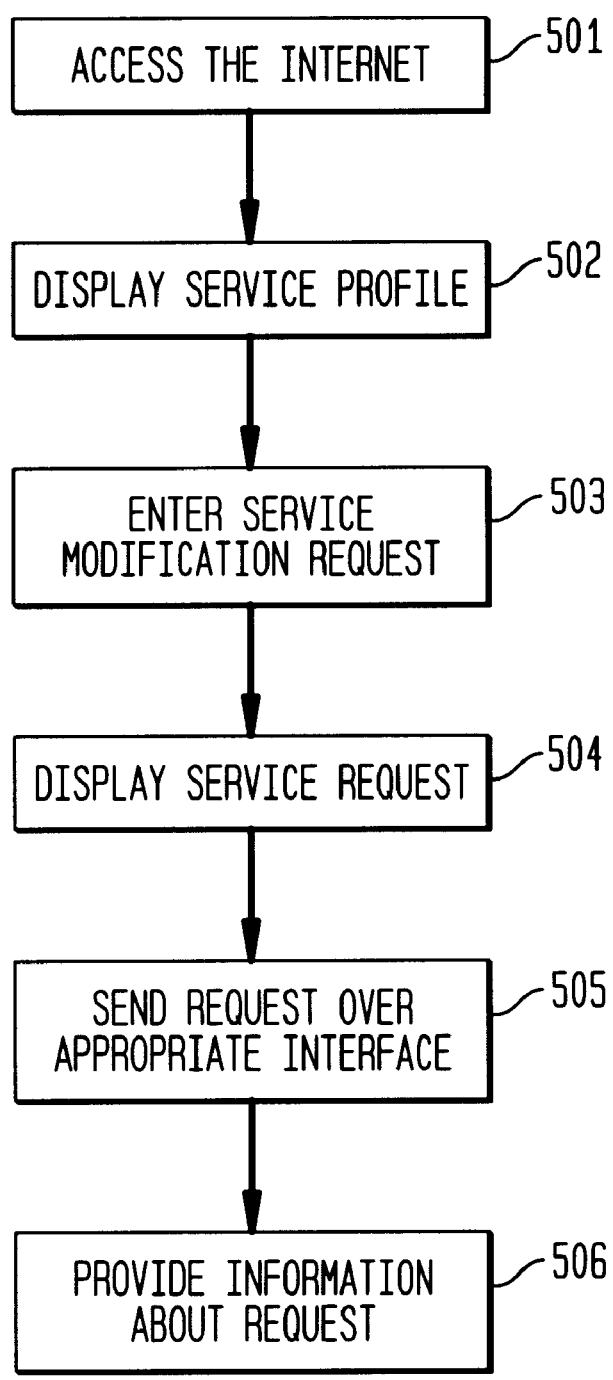
FIG. 5 is a flow diagram showing how a service request is made using an Internet based service control channel in accordance with one embodiment of the present invention.

FIG. 5 is a flow diagram showing how a request is made using the Internet based service control channel in accordance with one embodiment of the present invention. As shown in FIG. 5, an AIN subscriber first accesses the Internet and the Internet gateway in step 501. Included within step 501 is the step of accessing information about a particular service provider. This may be accomplished by accessing the home page of the service provider. After the service provider is accessed, a service profile of the services available to the AIN subscriber is displayed in step 502. Following such display, the AIN subscriber preferably enters a service modification request in step 503. As explained above, such a request could, for example, be a request to add an additional telephone service, or change a telephone service, or to receive customer-specific information. The present invention, however, is not so limited and also could include a request regarding ordering merchandise from a retailer, for example.

After the request is entered in step 503, it is displayed on a CRT, for example, to the user in step 504 so that the user can modify the request before it is sent to the gateway. The request is then sent over the appropriate interface in step 505. After being sent over the appropriate interface, information about the request is preferably sent to the AIN subscriber in step 506. The information provided to the AIN subscriber can be that a change in service, such as an addition or cancellation of service, has or will be processed by the provider, for example. Alternatively, the information could be the customer-specific information, such as billing data, requested by the AIN subscriber. In order for the provider to send such information to the AIN subscriber, it may be necessary for the provider to access its own databases and/or operations systems. As explained above with respect to FIG. 2, depending on the request, the appropriate interface 210–212 is selected and the service change is made. As also explained above, according to the method and apparatus of the present invention, the AIN subscriber can directly access information about his services and can directly make changes to those services.

Figure 6:
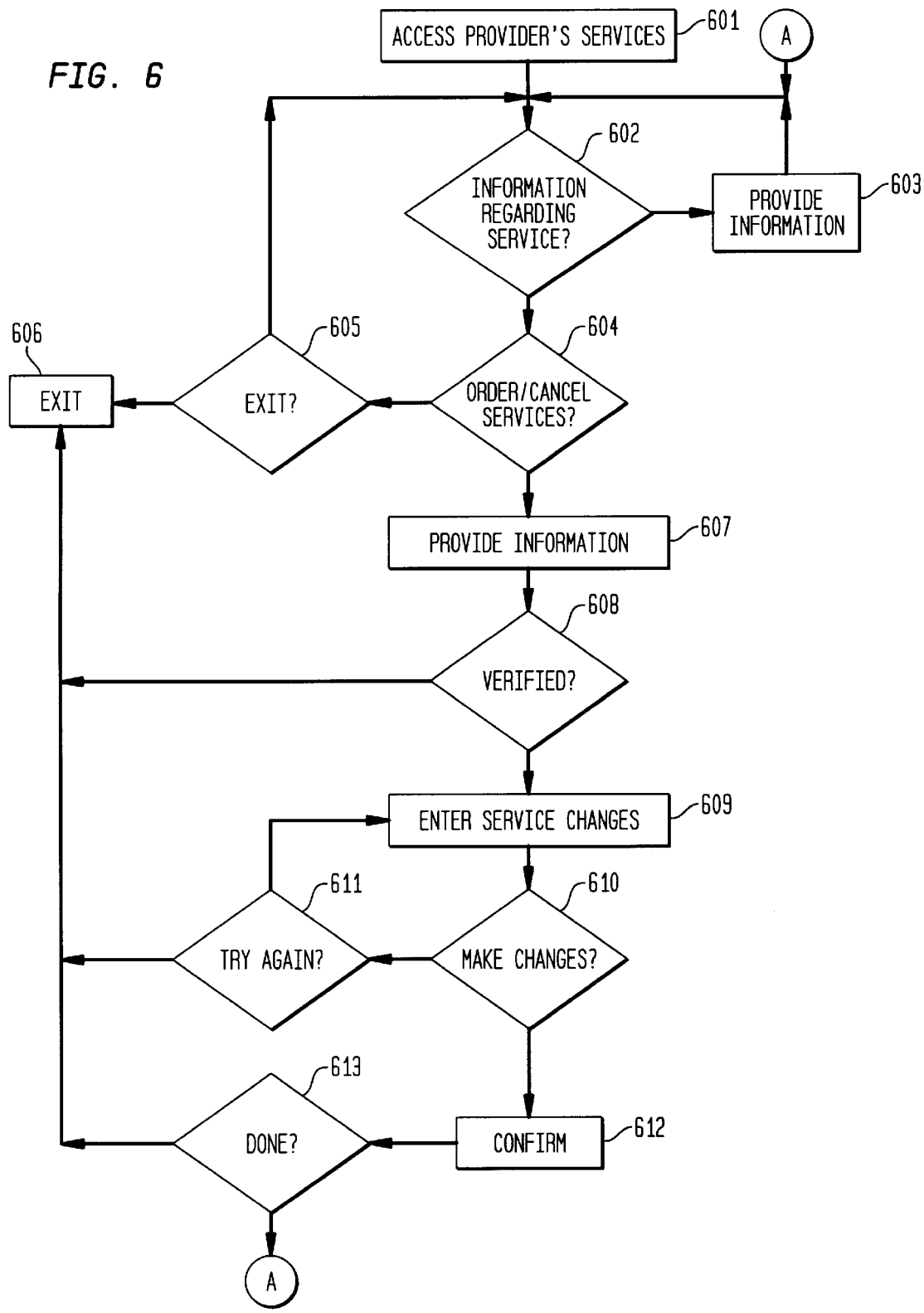
FIG. 6 is a flow diagram illustrating exemplary steps taken during an interface with a provider's service using an Internet based service control channel in accordance with one embodiment of the present invention.

FIG. 6 is a flow diagram illustrating exemplary steps during an interface with the Internet based service control channel of the present invention. In step 601, the AIN subscriber accesses the provider's services, and a home page screen, such as that shown in FIG. 4A, preferably. Next, in step 602, the AIN subscriber decides whether he wants to get any information about the provider's services. If yes, the information is provided from the appropriate databases of the provider's system in step 603. If the AIN subscriber does not want any additional information, then he proceeds to step 604 where he decides whether he wants to make any changes to his service. If the AIN subscriber does not want to change his services, in step 605, the AIN subscriber decides if he wishes to exit from the provider's services control Web page. If not, the AIN subscriber is returned to step 602 and if so, the AIN subscriber exits at step 606.

When the AIN subscriber wants to change his services information identification, a user identification and a password, is inputted by using, preferably, a keyboard (step 607). At step 608, the AIN subscriber is verified if the correct identification information was entered using conventional password checking techniques. If not, the AIN subscriber is exited at step 606. If the AIN subscriber is verified, then at step 609 the AIN subscriber enters the desired service changes. The AIN subscriber confirms whether the entered service changes are correct at step 610. If the changes are not correct, the AIN subscriber can choose, at step 611, to either correct the changes at step 609 or exit at step 606. If the changes are correct, the changes are sent to the appropriate gateway for service modification. Confirmation of the service changes is made at step 612. If the AIN subscriber is done accessing the provider's services, at step 613 he so indicates and preferably exits the provider's services at step 606. If the AIN subscriber is not finished, he is returned to step 602.

It should be noted that the steps shown in FIG. 6 are exemplary only and can differ depending on the type of services provided by the provider and can also differ depending on the type of user.

While there has been illustrated and described what are considered to be preferred embodiments and methods of the present invention, it will be understood to those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims

What I claim is:

1. In a telecommunications network providing advanced intelligent network services, a system for enabling a telecommunications subscriber having an Internet web browser to directly access information about the subscriber's telecommunications services and to modify those services, said system comprising:

a subscriber workstation for inputting requests to access telecommunications service-information and to modify telecommunications services, and for displaying service-information results and service-modification results;

an Internet gateway for accepting the service-information access requests and service-modification requests from said subscriber workstation and for passing the service-information results and service-modification results to said subscriber, the Internet gateway comprising a web server and an application engine; and a plurality of telecommunications network means connected to said Internet gateway, said means comprising a service creation application, a service activation control system, and an integrated services control point/node, and each of said means individually for accepting the service-information access requests and service-modification requests from said Internet gateway, for executing the service-information access requests and service-modification requests, and for returning the service-information results and service-modification results to said Internet gateway.

2. The system in accordance with claim 1 further comprising a file storage connected to said Internet gateway wherein said file storage includes a plurality of hypertext mark up language files and a plurality of JAVA Applets to be served to said subscriber workstation and to be used for inputting subscriber requests and for displaying subscriber results.

* * * * *